April 24, 1928.

H. B. REX

ADJUSTABLE MAGNET DEVICE

Filed July 29, 1927

1,667,638

Inventor:
Harold B. Rex,
by *[signature]*
His Attorney.

Patented Apr. 24, 1928.

1,667,638

UNITED STATES PATENT OFFICE.

HAROLD B. REX, OF LYNN, MASSACHUSETTS, ASSIGNOR TO GENERAL ELECTRIC COMPANY, A CORPORATION OF NEW YORK.

ADJUSTABLE MAGNET DEVICE.

Application filed July 29, 1927. Serial No. 209,375.

My invention relates to means for varying the effective magnetizing force of a magnetic circuit and while not limited thereto the invention is particularly advantageous for controlling the effective flux of permanent magnetic damping devices such as those employed in integrating meters. The invention is described in connection with a mercury watt hour meter to compensate the meter for errors produced by variations in voltage.

In carrying my invention into effect, I provide a magnetic circuit having parallel branches suitably magnetized, for example by permanent magnets, and provide electromagnetic means for controlling the division of the magnetic flux between the parallel branches without disturbing the total flux of such branches.

The features of my invention which are believed to be novel and patentable will be pointed out in the claims appended hereto. For a better understanding of my invention reference is made in the following description to the accompanying drawing in which Fig. 1 shows a preferred embodiment of my invention in which a permanent magnet is employed as a damping magnet for an integrating meter with electromagnetic means responsive to the voltage of the circuit, with which the meter is associated, for varying the effective damping flux of the permanent magnet and thus modifying the operation of the meter in a manner to improve its accuracy, and Fig. 2 represents voltage accuracy curves of such a meter before and after compensation by my invention.

Figure 1:
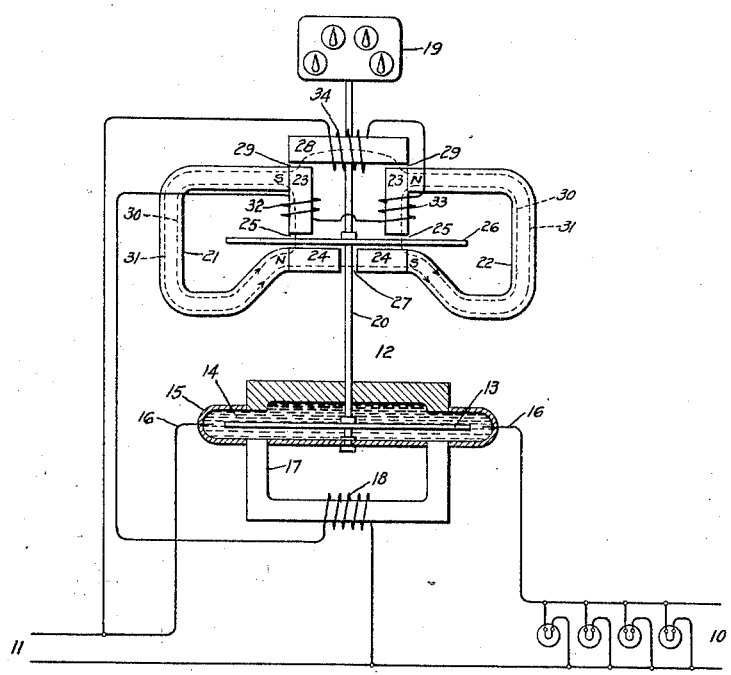

Referring to Fig. 1 there is shown an electrical load represented at 10, a source of supply 11 therefor, and a mercury watt hour meter 12 for measuring the load. Except for the structure of the damping device the meter is of usual construction and may be briefly described to comprise a rotatively mounted disc 13 of conducting material in a bath of conducting liquid such as mercury 14, a suitable inclosing vessel 15 with line current terminals 16 communicating with mercury on opposite sides of the disc 13, an electromagnet 17 energized by a voltage coil 18 from the source 11, the permanent magnet damping device to be hereinafter described, and a register 19 driven from the shaft 20 of the meter. The meter torque is theoretically proportional to the product of the line current flowing between terminals 16 and the flux component produced by the voltage electromagnet and when properly damped the speed is proportional to the watt load. The damping is, for the most part, produced by the damping device which in the usual construction comprises the ordinary permanent magnet and damping disc which produces a damping torque proportional to the speed. However the voltage electromagnet 17 of the meter, the flux of which cuts the armature disc 13, also produces a certain amount of meter damping and this damping flux varies with the voltage of source 11 and unless this variable damping force is compensated for a voltage error results.

Figure 2:
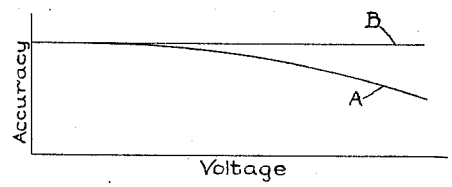

In Fig. 2 voltage accuracy curves are represented for this type of meter. If the voltage damping is not compensated the meter accuracy drops off with increase in voltage as represented by the curve A. The adjustable magnet of my invention is here employed as a damping magnet to compensate the meter for this voltage error and thus to bring the accuracy up to the 100% accuracy line represented at B at all voltages.

The damping device represented consists of two similar C-shaped permanent magnets 21 and 22 each with pole pieces 23 and 24 spaced apart to provide the air gaps 25 through which the damping disc 26 rotates. The pole pieces 23 and 24 are made of soft iron or other suitable magnetic material. To provide a branch path for the flux of the permanent magnets which does not cut the disc the lower pole pieces are extended towards each other and separated by an air gap 27 and another soft iron member 28 is provided between the upper pole pieces but separated therefrom by air gap 29. N and S poles of the permanent magnets 21 and 22 are opposite each other so that there are two parallel paths for the flux of these magnets, one through the disc and air gaps 25 as represented by the dotted lines 30, and the other through both permanent magnets, air gaps 27 and 29 and soft iron member 28.

If the reluctance of these two flux paths are properly proportioned the fluxes of the permanent magnets will normally divide equally between them which will be the condition assumed here. To accomplish this air gaps 25 may be made equal to 27 and air gaps 29 are made equal to each other, and are adjusted to have a total series reluctance equal to gap 27. Now it is seen that the effective damping flux is that portion of the total which traverses the air gaps 25.

The next step of the invention is to provide means for varying the flux distribution between the two paths in response to some variable condition to be compensated for which, in this case, is the voltage of the circuit 11 and in such manner as to correct for this variable. This is accomplished by providing coils 32, 33 and 34 wound on members 23 and 28 to produce a flux around the soft iron magnetic circuit formed by 28 and the two sets of pole pieces 23 and 24. These coils are preferably connected in series and are so proportioned that they have no tendency to change the total flux through either permanent magnet, but merely change the ratio of the permanent magnet flux flowing through the two branches. Coils 32 and 33 should be equal so as not to unbalance the two halves of the device. These coils may be connected and energized by direct current to oppose or assist the flux threading the air gaps 25 to either decrease or increase the damping flux with an increase in current through them. In the present case they are connected in series with the voltage coil 18 across the source 11 so that an increase in voltage will result in a decrease in the flux at 25. As thus connected coils 32 and 33 oppose the fluxes in the pole pieces 23 tending to cross the air gaps 25 so that the flux, indicated by dotted lines 30, decreases, while coil 34 assists the flux, indicated by dotted line 31, causing it to increase to the same extent. The total flux of the permanent magnets, and the reluctance of the magnetic circuit as a whole thus remain constant which is very important, as otherwise the permanent strength of the permanent magnets would be changed. It is now apparent that an increase in voltage, which increases the damping effect of the voltage electromagnet 17 on disc 13, is offset by a corresponding decrease in damping on disc 26. By properly proportioning the influence of the flux shifting coils 32, 33 and 34 on the damping flux the error produced by variations in voltage on this type of meter may be entirely eliminated and the meter accuracy made to correspond to the curve B, Fig. 2.

It will be evident that so far as the flux shifting function of the electromagnet portion of the damping device is concerned the permanent magnets might be replaced by electromagnets and the total flux produced by such electromagnets might be made to vary within reasonable limits. The flux shifting arrangement described would still function in the same way to vary the distribution of the flux through the parallel branches without tending to alter the total value of such flux because the effective reluctance of the magnetic circuit considered as a whole remains unchanged.

If the magnets 21 and 22 are replaced by alternating current electromagnets the coils 32, 33 and 34 should then be energized by an alternating current of the same frequency and phase relation.

I have described a preferred embodiment of my invention and one of its applications; however, I do not intend to limit my claims to this particular embodiment and application because it will be evident to those skilled in the art that the invention is of vastly wider scope and consequently I seek claims commensurate with the true spirit and scope of such invention.

What I claim as new and desire to secure by Letters Patent of the United States, is:—

1. Compensating means for electric measuring devices comprising a magnet system having a magnetic circuit, a portion of which is divided to provide parallel branches for the flux thereof, and electromagnetic means arranged to modify the distribution of the flux of said device through said parallel branches without changing the effective reluctance of said circuit as a whole.

2. A magnet system having a constant reluctance magnetic circuit, a portion of which is divided to provide parallel branches for the flux thereof, and magnetizing coils for said branches arranged to modify the distribution of the flux of said magnet through said parallel branches without altering the total flux thereof.

3. A magnet system having a constant reluctance magnetic circuit, a portion of which is divided to provide two parallel branches for the flux thereof, and magnetizing coils on both branches energized to oppose the flux through one branch and assist it through the other branch to the same extent whereby variation in the energizing current of said coils causes a variation in the flux distribution of said magnet system in said parallel branches without tending to alter the total flux of said system.

4. A magnetic system having parallel magnetic circuits for the flux thereof, said parallel circuits being provided with air gaps proportioned so that the effective reluctance of the parallel circuits are similar, and electromagnetic means arranged to modify the distribution of the flux of said device through said parallel branches without changing the reluctance of the device as a whole.

5. A magnet system comprising two substantially C-shaped magnets, soft iron members associated with the poles of both magnets and with each other to provide parallel paths for the fluxes of said magnets, one path in series with both magnets and other paths through the individual magnets, said soft iron members being separated from each other by air gaps proportioned to normally cause the flux of each magnet to divide equally between said series path and its individual path, and energizing coils on said soft iron members arranged to modify the distribution of the fluxes of said magnets between the series path and the individual paths without altering the total flux of said magnets.

6. A magnet system comprising two similar substantially C-shaped permanent magnets, soft iron pole pieces for each magnet separated from each other by air gaps to provide a local path for the flux of each magnet, one pole piece on each magnet being extended and positioned to form a similar air gap between the pole pieces of the two magnets which are of opposite magnetic polarity, a soft iron member extending between but separated from the other pole pieces of said magnets which are of opposite magnetic polarity thereby forming a flux path which is in series with the two magnets and in parallel to the local paths, the effective reluctance of said series path being equal to the effective reluctances of the two local paths, and windings associated with the soft iron portions of said device for oppositely influencing the permanent magnetic fluxes in said series and in said local paths.

7. A compensating device for electric meters comprising magnetic means for producing a substantially constant magnetizing flux, parallel paths for said flux, the flux which traverses one of said paths influencing the operation of the meter and the flux of the other path having no direct effect upon the operation of the meter, and electromagnetic means for varying the distribution of the total flux of said magnetic means between said parallel paths.

8. A variable damping magnet system for electric meters comprising permanent magnet means for producing a substantially constant flux, parallel paths for said flux of substantially equal effective reluctance, one of said paths including a rotatably mounted damping disc, and electromagnetic means for varying the distribution of said substantially constant flux between said parallel paths.

9. A compensating device for electric meters comprising in combination with a permanent magnetic damping device, of electromagnetic means for varying the effective damping flux thereof in accordance with a variable to be compensated, said means comprising parallel magnetic paths for the total permanent magnet flux, only one of which carries the effective damping flux, and coils wound thereon so as to oppose the flux in one path and assist the flux in the other path.

10. An integrating electric meter having a driving electromagnetic system and a permanent magnet damping system, said meter being subject to an error by reason of a damping force produced by the driving magnetic system, and means for compensating the meter for such error comprising electromagnetic means associated with the damping magnetic system and energized with the driving magnet system for varying the damping force of the damping magnetic system.

11. An integrating electric meter having a driving magnet system provided with an electromagnet which produces, in addition to a driving component, a damping force, a permanent magnet damping system for said meter, and electromagnetic means associated with said damping magnet system and energized in series with the aforesaid electromagnet of the driving magnet system for varying the damping force of said damping magnet system inversely with the damping force of said driving electromagnet, thereby maintaining the total damping of the meter independent of the damping force produced by the electromagnet of said driving magnet system.

12. An integrating electric meter, a source of supply with which said meter is associated, a permanent magnet damping system for said meter, and electromagnetic means responsive to a variable condition of said source of supply for varying the damping effect of said permanent magnetic damping system.

In witness whereof, I have hereunto set my hand this 27th day of July 1927.

HAROLD B. REX.